Aug. 4, 1925.                                              1,548,314
                    J. B. HENDERSON ET AL
METHOD OF DETERMINING THE TRUE VERTICAL ON BOARD AEROPLANES AND AIRSHIPS
   AND IN THE METHOD OF DIRECTING PROJECTILES DROPPED FROM THE SAME
                      Filed Sept. 20. 1919          2 Sheets—Sheet 1
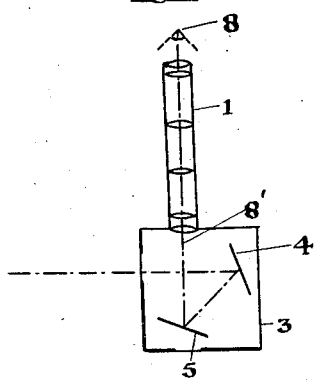
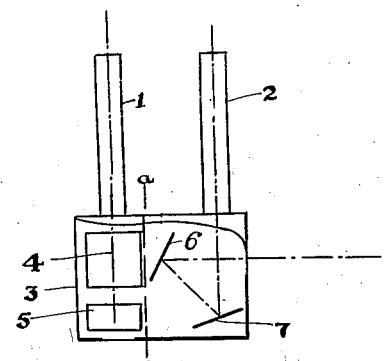
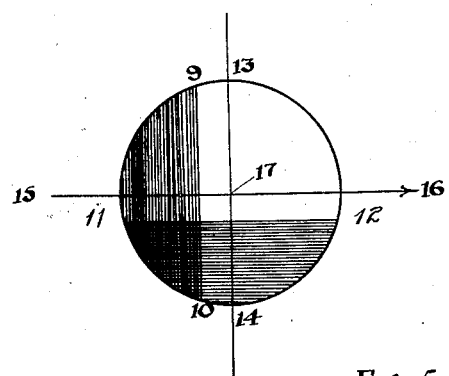
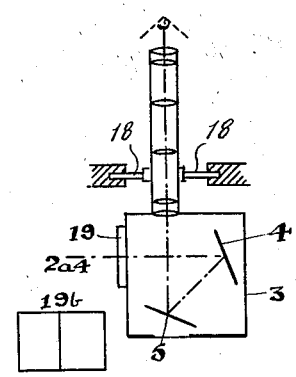
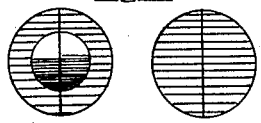
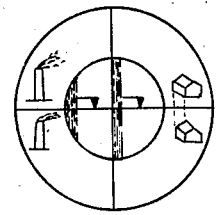
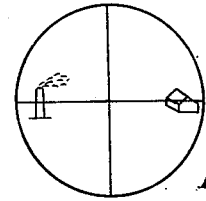
*Inventors*
*James Blacklock Henderson*
*Bernard Parker Haigh*
*By Hoakley & Gill*
*Attorneys*

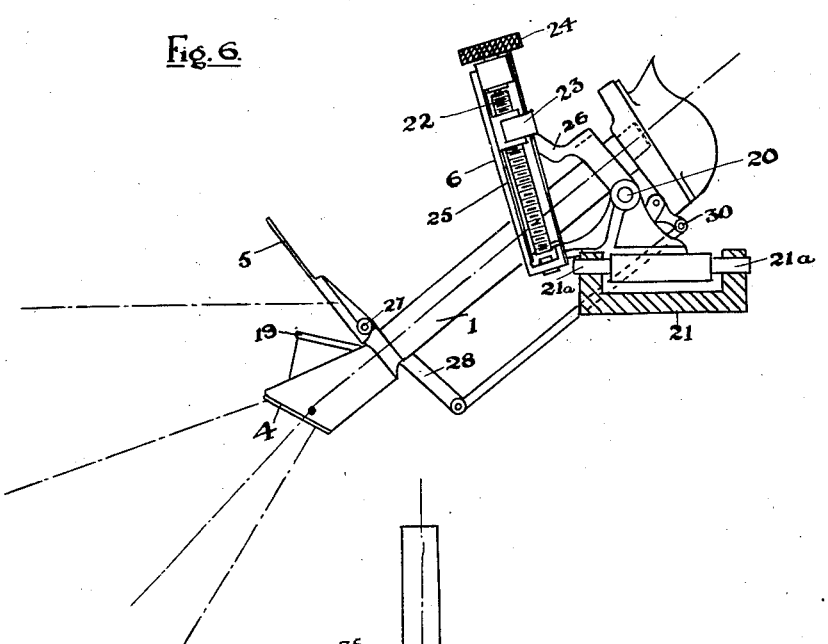
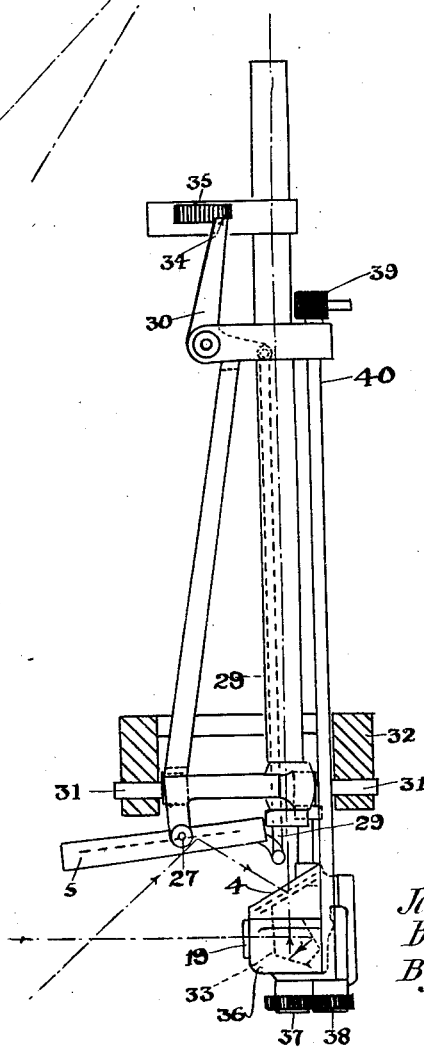

Patented Aug. 4, 1925.

1,548,314

UNITED STATES PATENT OFFICE.

JAMES BLACKLOCK HENDERSON, OF LEE, AND BERNARD PARKER HAIGH, OF LEWISHAM, ENGLAND.

METHOD OF DETERMINING THE TRUE VERTICAL ON BOARD AEROPLANES AND AIRSHIPS AND IN THE METHOD OF DIRECTING PROJECTILES DROPPED FROM THE SAME.

Application filed September 20, 1919. Serial No. 325,175.

(GRANTED UNDER THE PROVISIONS OF THE ACT OF MARCH 3, 1921, 41 STAT. L., 1313.)

*To all whom it may concern:*

Be it known that we, JAMES BLACKLOCK HENDERSON and BERNARD PARKER HAIGH, subjects of the King of Great Britain, residing at 2 Cambridge Road, Lee, and 44 Caterham Road, Lewisham, in the county of Kent, England, have invented certain new and useful improvements in the methods of determining the true vertical on board aeroplanes and airships and in the methods of directing projectiles dropped from the same (for which we have filed an application in England, No. 239, January 6, 1915), of which the following is a specification.

The object of our invention is to determine the direction of the true vertical on board an aeroplane or airship and to provide a director which will compensate for the speed and height of the aeroplane when dropping bombs or other projectiles.

On board an aeroplane, airship or other body subjected to acceleration other then that of gravity the direction of the resultant acceleration is the virtual vertical, hence a pendulum on board does not indicate the direction of gravity but the direction of the resultant acceleration. In employing aeroplanes or airships for reconnaissance work such as that of indicating the position of the enemy's guns, it is desirable that the observer on board the aeroplane should be able to determine accurately when he is vertically over the target in question. For this purpose we provide a "vertical director" which is so constructed that images of the horizon in two directions preferably at right angles to each other are superposed by reflection on the field of view of the landscape below the aeroplane or airship.

When dropping bombs or firing projectiles at any target it is necessary to fire these projectiles when the target subtends at the eye a certain angle with the true vertical. For this purpose we combine with the vertical director an adjustment which enables the observer to set off any angle with the true vertical and an instrument embodying this adjustment we call the "bomb sight." If, however, a bomb sight be set to make zero angle with the true vertical it is a vertical director but is necessarily heavier and not so handy as a single vertical director which in some modifications can be easily held in the hand.

The vertical director may be made with a telescope or telescopes or without them, or telescopes may be used having no magnification in order to be able to place the eye virtually at some point say below the deck where there is an unobstructed view of the landscape.

In the accompanying drawings illustrating our invention,

Figs. 1 and 2 are diagrammatic sectional views of a vertical director, Fig. 1 being a vertical section on the line *a a* of Fig. 2, Fig. 3 shows the appearance of the field of view seen through the instrument, Fig. 4 shows an alternative arrangement of vertical director, Fig. 5 shows the two fields of view seen in the instrument of Fig. 4, Figs. 6 and 7 are elevations of two alternative constructions of bomb sight, and Fig. 8 shows the two fields of view obtained in a bomb sight when the horizon is obscured.

Referring to Figs. 1 and 2 the vertical director comprises two telescopes 1 and 2 mounted on a suitable casing 3 containing the mirrors 4 and 5 and 6 and 7. The mirrors may be either pivotally or rigidly attached to the telescope but they are rigidly attached to each other and inclined to each other at 45°. The mirror 5 is semi-silvered so that the silvering is transparent or it may be wholly silvered and the silvering partly removed in strips or checker pattern. The telescope may be of a type giving no magnification, the arrangement of lenses being such that the eye is virtually placed at the point 8' (Fig. 1) the eye being really at the point 8. A direct view of the ground is seen through the telescope and an image of the horizon (say ahead of the aeroplane) is formed by double reflection from the mirrors 4 and 5. An image of the horizon on the beam of the aeroplane is formed by double reflection from the mirrors 6 and 7. A direct view of the ground is obtained through the telescope 1 and images of the horizon ahead and on the beam of the aeroplane are seen superposed on the image of the landscape below. The point of intersection of the horizon images is very approximately the point vertically under the observer. The deviation from the vertical is due to the height of the aeroplane causing the horizon to be depressed below the horizontal. To correct for this deviation we may fit a screw adjustment to the angle between the two pairs of mirrors or we may fit in each telescope a cross wire perpendicular to the plane of reflection of the two mirrors so that the cross wire is parallel to the image of the horizon formed by that telescope. The appearance of the field of view is then as illustrated in Fig. 3. The two horizons 9—10 and 11—12 are seen superposed on the view of the ground below and the intersection of the two cross wires 13—14 and 15—16 at the point 17 gives the point on the ground vertically below the aeroplane.

We may employ an alternative arrangement having both horizon images viewed by one eye, say the left, and only a direct image of the ground viewed by the right eye. For this purpose we duplicate the mirrors 4 and 5 in Fig. 1 placing the second pair (not illustrated) below the first pair and with their line of intersection also horizontal but perpendicular to the line of intersection of the first pair of mirrors 4 and 5. The image of the horizon formed by the second pair is then viewed through the lower mirror 5 of the upper pair, the silvering of which is transparent or partly removed in strips or checker pattern. The lower of the mirrors of the second pair is wholly silvered. Since there is nothing in common between the fields of view seen by the two eyes cross wires must be fitted in both telescopes to give a directional control to the eyes.

An alternative arrangement which we may employ in some cases is shown in Fig. 4. The telescope say for the left eye is similar to that described above and illustrated in Fig. 1, except that it is mounted on trunnions 18 which are, for example, fore and aft in the aeroplane. A biprism 19 is fitted in the horizon beam 2ᵃ—4. The prism is of the form shown in elevation at 19ᵇ and in plan at 19ᵃ and by reason of its form it throws on the mirror 4 images of two different portions of the horizon. The centre of the mirror 5 is silvered and the outside is clear glass. The view seen through the telescope is then like that illustrated in Fig. 5. The left eye sees an image of the ground in the outer part of the field as illustrated in the left hand view of Fig. 5 intersected by a cross wire, and in the centre circle sees two horizons or one discontinuous horizon as illustrated separated by the cross wire. The right eye sees only an image of the ground as shown in the right hand view of Fig. 5. The telescope is rocked on the trunnions 18 until the two horizons become continuous. The point of the landscape which agrees with the intersection of the horizon and the cross-wire is then approximately the point on the landscape which is vertically below the observer.

In order to arrange the instrument as a bomb sight as shown in Fig. 6, we fit an adjustment to the angle between the two mirrors forming the image of the horizon. In the figure both telescopes are shown looking directly at the target while the image of the horizon ahead is formed in the left telescope by double reflection in the mirrors 4 and 5 and the image is duplicated by the biprism 19. The angle between the mirrors 4 and 5 is varied by a screw adjustment device designated as a whole by 6'. The binocular telescope 1 carrying the two mirrors 4 and 5 and the biprism 19 attached to the left telescope of the binocular is pivoted as a whole on the fulcrum 20 which is attached to the base 21. The base 21 is pivotally mounted on the aeroplane on the fore and aft pivots 21ᵃ. The base 21 carries the screw 22 and nut 23, the screw being fitted with the divided head 24, and the nut being prevented from turning by the guides 25. The crank 26 is rigidly attached to the binocular telescope and engages with a pivoted slide on the nut 23 so that when the screw 22 is turned the nut 23 is translated in the guides 25 and turns the telescope 1 about the fulcrum 20. The mirror 5 is pivotally supported on the telescope 1 on the pivots 27 and its motion on the pivot is controlled by the crank 28 which is connected by the rod 29 with the crank 30, one end of the crank being clamped to the pin 20 so that the crank 30 and the telescope 1 move together but their relative position can be adjusted by changing the setting of the clamp upon the pin 20. The length of the crank 30 is approximately one half of the length of the crank 28 so that the mirror 5 turns through one half the angle turned through by the telescope 1. The friction clamp between the crank 30 and the pin 20 provides an adjustment for compensating for depression of the horizon below the horizontal due to the height of the aeroplane.

The arrangement of the fields of view is preferably like those shown in Fig. 5. Fig. 7 shows an alternative arrangement of the bomb sight in which the binocular telescope is placed vertically in the aeroplane say between the observer's knees, the mirror arrangement being situated below the deck where the outlook is clear. The binocular telescope 1 is pivotally mounted on the fore and aft pivots 31 in the base 32 which is attached to the deck. The binocular frame carries the two mirrors 4 and 5 which cover both telescopes, the pentagonal prism 33 and the biprism 19 are opposite the left telescope. The mirror 5 is mounted on the pivots 27 and is connected by the rod 29 with the crank 30 and the pointer 34 which reads on the tangent scale 35. The pentagonal prism 33 and biprism 19 are mounted in a box 36 which can be rotated about its vertical axis by the toothed gears 37 and 38 by the milled head 39 and shaft 40 so that any portion of the horizon may be viewed by the pentagonal prism 33. The arrangement of the fields of view is preferably like that shown in Fig. 5.

When the horizon is obscured the bomb sight is useless in its normal arrangement. To overcome this defect we arrange the instrument to utilize the vertical sides of a house or other object in the field of view. In the arrangement shown in Fig. 6 we rotate the biprism 19 through 90° about the axis of the beam so that it duplicates the image vertically instead of horizontally. Then by moving the crank 30 on the pin 20 the field of view in the mirrors 4 and 5 may be lowered to embrace some object on the landscape which has vertical lines such as a house, then by tilting the instrument on the fore and aft trunnions the vertical lines of the two images of the house may be made colinear and perpendicular to the horizontal cross wire. The instrument is then set in the fore and aft vertical plane. The sight may then be used like a fixed sight if the pilot keeps the height constant and controls the pitching of the aeroplane within narrow limits.

To overcome the error introduced by the pitching of the aeroplane we may use the same system of duplicated images in the lateral direction as well as in the fore and aft direction. For example in Fig. 7, we may use two biprisms one in the beam from the target to the left eye only, placed say between the mirrors 4 and 5, as illustrated in Fig. 7, and one in the beam which passes through the pentagonal prism. We replace the pentagonal prism by another or by two mirrors which turn the beam through say 45° instead of 90° so that a view of the ground about 45° from the vertical is obtained through the pentagonal prism. The box containing the pentagonal prism is turned so that this view is that of the ground on the beam. The field of view in the left telescope then contains 4 images like Fig. 8, in which the object on the beam is represented as a flagstaff and that ahead as a chimney. The right eye retains as before only an image of the landscape ahead containing the target aimed at.

The instrument is advantageously supported on gimbals to make the adjustments easier, the tilting on the fore and aft trunnion brings the flagstaffs in line and the tilting on the athwartships axis brings the chimneys in line. When both adjustments are correct the instrument is correctly set as it would be if the horizon were visible.

Having now particularly described and ascertained the nature of our said invention and in what manner the same is to be performed we declare that what we claim is:—

1. The method of determining the true vertical from an aircraft or the like which consists in superposing upon an image of the landscape below the craft images of separated distant points lying substantially horizontally with respect to the craft, and produced by reflected beams lying parallel to the line of sight to the landscape.

2. The method of determining the true vertical from an aircraft or the like which consists in superposing upon an image of the landscape below the craft double-reflected images of separated distant points located substantially horizontally with respect to the craft.

3. The method of determining the true vertical from an aircraft or the like which consists in superposing upon an image of the landscape below the craft images of two portions of the horizon lying substantially at right angles to each other, and produced by reflected beams lying parallel to the line of sight to the landscape.

4. An instrument for use on an aircraft or the like, for determining the true vertical, comprising means for producing an image of the landscape below the craft and means for superposing upon said image images of horizontally separated points displaced from the vertical.

5. An instrument for use on an aircraft or the like for determining the true vertical, comprising means for producing an image of the landscape below the craft and means for superposing upon said image images of separated distant points located substantially horizontally with respect to the craft.

6. An instrument for use on an aircraft or the like for determining the true vertical, comprising means for producing an image of the landscape below the craft and means for superposing upon said image images of separated points of the horizon.

7. An instrument for use on an aircraft or the like for determining the true vertical, comprising means for producing an image of the landscape below the craft and means for superposing upon said image images of the horizon ahead of the craft and on the beam.

8. An instrument for use on an aircraft or the like for determining the true vertical, comprising means for producing an image of the landscape below the craft and means for superposing upon said image images of distant objects ahead of the craft and on the beam.

9. An instrument for use on an aircraft or the like for determining the true vertical, comprising means for producing an image of the landscape below the craft and means for superposing upon said image images of two portions of the horizon lying at substantially right angles to each other.

10. An instrument for use on an aircraft or the like for determining the true vertical, comprising means for producing an image of the landscape below the craft and means for superposing upon said image images of points located substantially horizontally with respect to the craft and means for compensating for the effect of the altitude of the craft upon the superposed images.

11. Apparatus for use on an aircraft or the like for determining the true vertical, comprising an instrument through which the landscape below the craft may be viewed and means associated with the instrument for producing in the field of view images of separated points lying substantially horizontally with respect to the craft.

12. Apparatus for use on an aircraft or the like for determining the true vertical, comprising an instrument through which the landscape below the craft may be viewed and mirrors associated with the instrument for producing in the field of view images of separated points lying substantially horizontally with respect to the craft.

13. Apparatus for use on an aircraft or the like for determining the true vertical, comprising an instrument through which the landscape below the craft may be viewed, a pair of angularly disposed mirrors positioned with respect to the path of vision through the instrument to the landscape whereby superposed images of points lying substantially horizontally with respect to the craft may be seen in the field of view, and means for adjusting the angle between the mirrors to compensate for the effect of altitude of the craft upon the superposed images.

14. A bomb sight for use upon aircraft or the like, comprising a pivotally mounted telescope adapted to be directed toward the target, means for adjusting the position of the telescope and means for producing in the field of view of the telescope images of separated distant points lying substantially horizontally with respect to the craft.

15. A bomb sight for use upon aircraft or the like, comprising a pivotally mounted telescope adapted to be directed toward the target, means for adjusting the position of the telescope, means for producing in the field of view of the telescope images of separated points lying substantially horizontally with respect to the craft and means for adjusting said last named means in accordance with changes in position of the telescope.

16. A bomb sight for use upon aircraft and the like, comprising a telescope mounted to swing about two axes lying at right angles to each other and adapted to be directed toward the target, means for producing in the field of view of the telescope images of points lying substantially horizontally with respect to the craft and means whereby motion of the telescope causes a change in the adjustment of said means.

17. The method of determining the true vertical from an aircraft or the like which consists in forming in conjunction with a view of the landscape below the craft, images of distant objects separated from each other by a substantial horizontal angle.

18. The method of determining the true vertical from an aircraft or the like which consists in forming in conjunction with a view of the landscape below the craft, images of distant objects lying substantially at right angles to each other in a horizontal plane.

19. The method of determining the true vertical from an aircraft or the like which consists in forming in conjunction with a view of the landscape below the craft, images of distant objects ahead of the craft and on the beam.

20. An instrument for use on an aircraft or the like for determining the true vertical, comprising a device for viewing the landscape below the craft, and means for forming in the field of view of the device images of distant objects separated from each other by a substantial horizontal angle.

21. An instrument for use on an aircraft or the like for determining the true vertical, comprising a device for viewing the landscape below the craft, means for forming in the field of view of the device images of distant objects having vertical lines, and means whereby the instrument may be moved to make the vertical lines of the objects colinear.

22. An instrument for use on an aircraft or the like for determining the true vertical, comprising a device for viewing the landscape below the craft and provided with cross wires, means for forming in the field of view of the device images of distant objects having vertical lines, and means whereby the instrument may be moved to make the vertical lines of the objects colinear and perpendicular to the cross wires.

23. The method of determining the true vertical from an aircraft or the like which consists in superposing upon an image of the landscape below the craft two images of a point located substantially horizontal with respect to the craft and adjusting said two images into coincidence.

24. An instrument for use on an aircraft or the like for determining the true vertical comprising a sighting device for producing an image of the landscape below the craft, means for superposing upon said image a pair of images of a point located substantially horizontal with respect to the craft and means for adjusting the device to bring said two images into coincidence.

25. Apparatus for use on an aircraft or the like for determining the true vertical, comprising an instrument through which the landscape below the craft may be viewed, a plurality of pairs of angularly disposed mirrors positioned with respect to the path of vision through the instrument to the landscape whereby superposed images of points lying substantially horizontally with respect to the craft may be seen in the field of view and means for adjusting the angle between the mirrors of each pair to compensate for the effect of altitude of the craft upon the superposed images.

JAMES BLACKLOCK HENDERSON.
BERNARD PARKER HAIGH.